United States Patent
Cloud

(10) Patent No.: US 8,186,370 B2
(45) Date of Patent: *May 29, 2012

(54) SOLENOID PLUNGER CORE SEAL

(75) Inventor: J. Brian Cloud, Greenwood, IN (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 779 days.

This patent is subject to a terminal disclaimer.

(21) Appl. No.: 12/251,495

(22) Filed: Oct. 15, 2008

(65) Prior Publication Data

US 2010/0090141 A1    Apr. 15, 2010

(51) Int. Cl.
*F16K 31/02* (2006.01)

(52) U.S. Cl. ............ 137/15.18; 137/15.17; 137/315.03; 251/358; 251/129.15

(58) Field of Classification Search ............. 251/129.15, 251/258, 358; 137/15.01, 15.17, 15.18, 315.03
See application file for complete search history.

(56) References Cited

U.S. PATENT DOCUMENTS

| | | | | |
|---|---|---|---|---|
| 2,368,887 A * | 2/1945 | Schuler | | 251/358 |
| 2,893,687 A * | 7/1959 | Huthsing, Sr. | | 251/357 |
| 3,013,768 A * | 12/1961 | La Mastra | | 251/129.15 |
| 3,326,521 A * | 6/1967 | Murray | | 251/358 |
| 3,861,646 A * | 1/1975 | Douglas | | 251/356 |
| 4,336,920 A * | 6/1982 | Murray | | 251/357 |
| 4,860,995 A * | 8/1989 | Rogers | | 251/356 |
| 4,936,337 A * | 6/1990 | DuHack | | 137/329.04 |
| 5,467,961 A | 11/1995 | Sausner et al. | | |
| 5,503,366 A * | 4/1996 | Zabeck et al. | | 251/129.18 |
| 6,019,344 A * | 2/2000 | Engel et al. | | 251/64 |
| 6,029,903 A | 2/2000 | Fukano et al. | | |
| 6,065,734 A * | 5/2000 | Tackett et al. | | 251/129.02 |
| 6,595,485 B2 * | 7/2003 | Burrola et al. | | 251/64 |
| 6,666,429 B2 | 12/2003 | Fukano et al. | | |
| 6,679,567 B1 * | 1/2004 | Tackett et al. | | 303/119.2 |
| 6,830,232 B2 * | 12/2004 | Burrola et al. | | 251/64 |
| 7,143,956 B2 | 12/2006 | Fukano et al. | | |
| 7,222,837 B1 * | 5/2007 | Blume | | 251/332 |
| 7,337,805 B2 | 3/2008 | Brown et al. | | |
| 7,703,744 B2 * | 4/2010 | Wagner | | 251/129.15 |
| 2008/0210897 A1 | 9/2008 | Wagner | | |

* cited by examiner

*Primary Examiner* — John Rivell
*Assistant Examiner* — Matthew W Jellett
(74) *Attorney, Agent, or Firm* — Dan Sepanik, Esq.; Harness, Dickey & Pierce, P.L.C.

(57) ABSTRACT

A solenoid valve may include a housing, a solenoid coil, and a plunger. The solenoid coil may be disposed about an external portion of the housing and the plunger may be slidably disposed within the housing. The plunger may include a recess in a first end thereof having a seal assembly located therein and including a pin member inserted into the recess and an elastomeric sealing element molded around the pin member while inserted into the recess of the plunger.

13 Claims, 3 Drawing Sheets

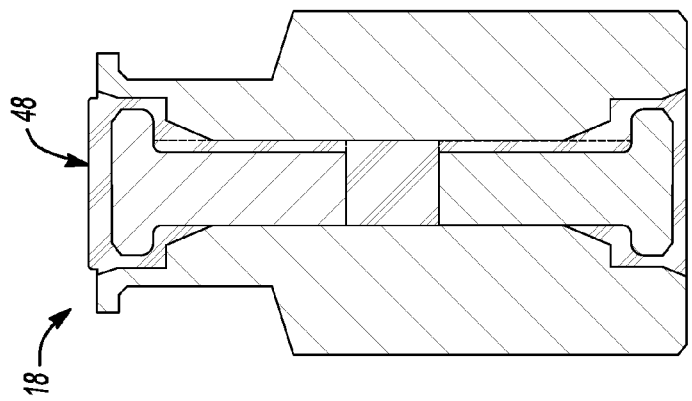
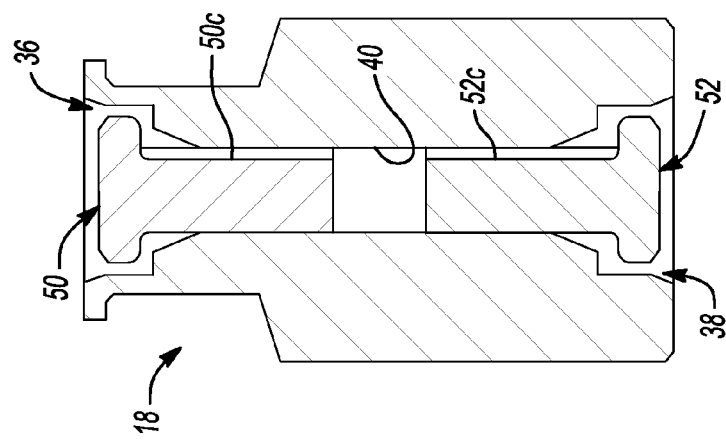
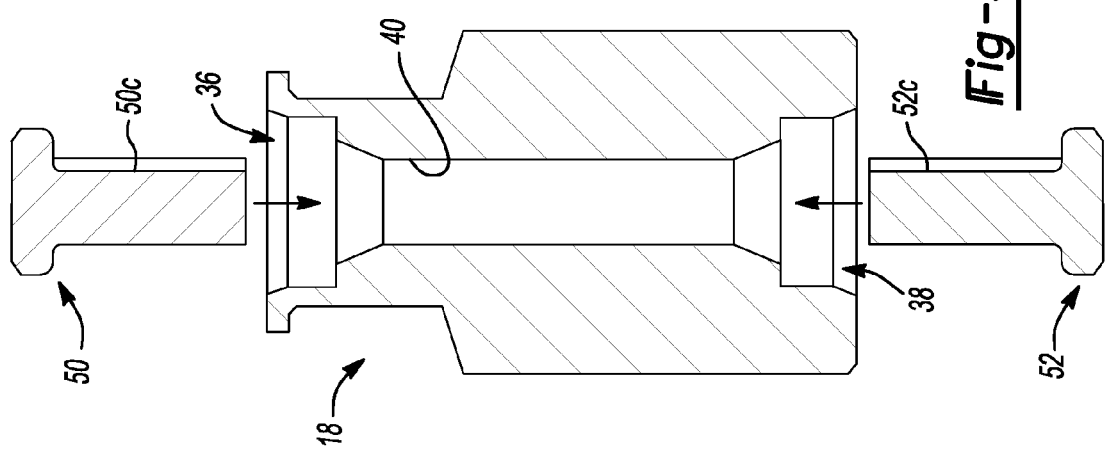

SOLENOID PLUNGER CORE SEAL

FIELD

The present disclosure relates to valves, and more specifically to seal members for solenoid plungers.

BACKGROUND AND SUMMARY

The statements in this section merely provide background information related to the present disclosure and may not constitute prior art.

Solenoid plunger assemblies requiring a sealing member for engagement with a port to be sealed often require some sort of adhesive to retain the sealing member in position. Using adhesive for coupling sealing members to a solenoid plunger can result in manufacturing issues since the adhesive may escape past a desired location where a coating is not allowed, or may not reliably hold.

According to the present disclosure, a solenoid valve may include a housing, a solenoid coil, and a plunger. The solenoid coil may be disposed about an external portion of the housing and the plunger may be slidably disposed within the housing. The plunger may include a recess in a first end thereof having a seal assembly located and retained therein. The seal assembly includes a pin member inserted into the recess and an elastomeric sealing element molded around the pin member while inserted into the recess of the plunger.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 3a-3c illustrate process steps for making a solenoid plunger assembly according to the principles of the present disclosure.

DETAILED DESCRIPTION

Figure 1:
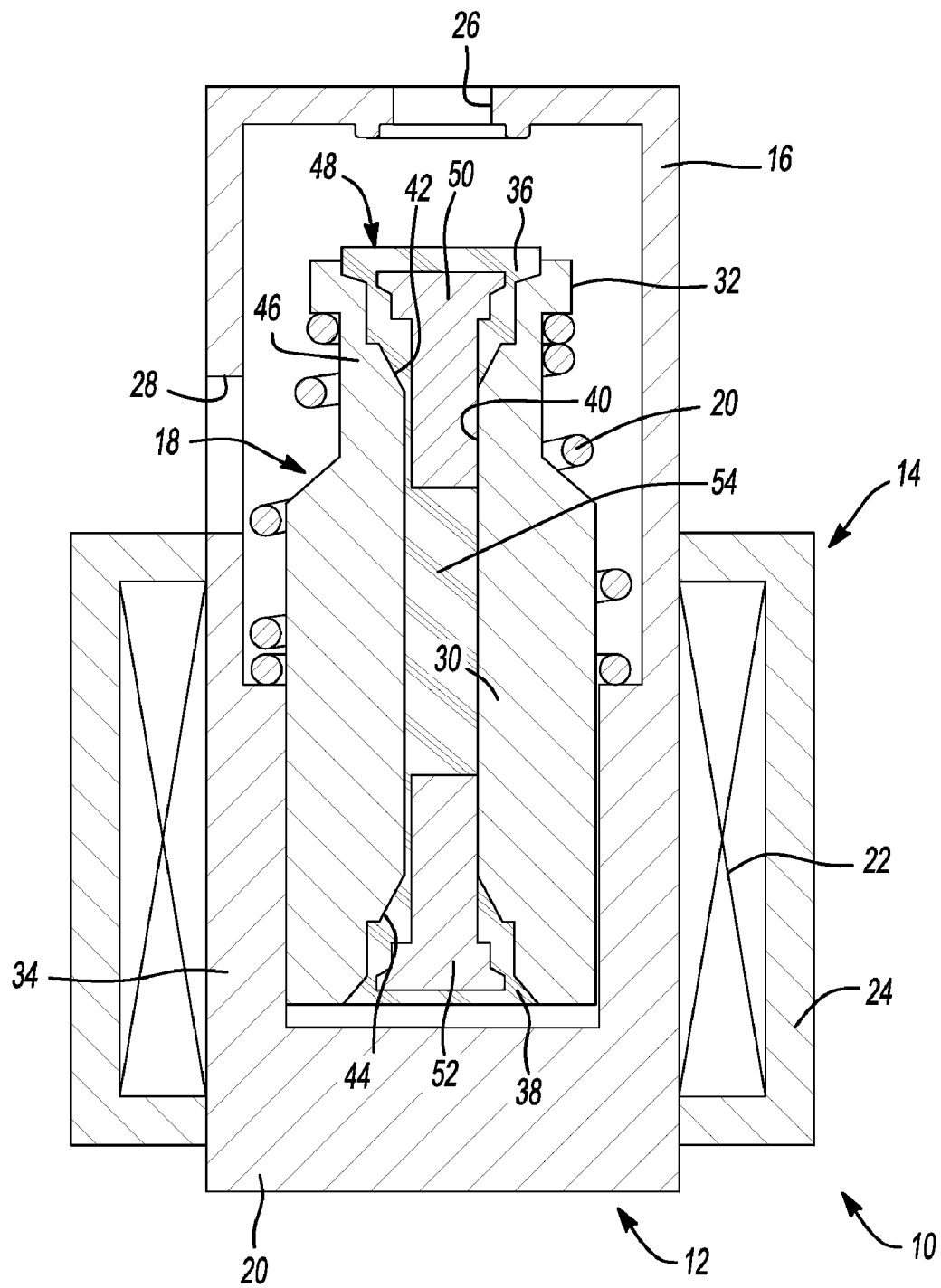
FIG. 1 is a section view of a solenoid valve assembly according to the principles of the present disclosure.
Figure 2:
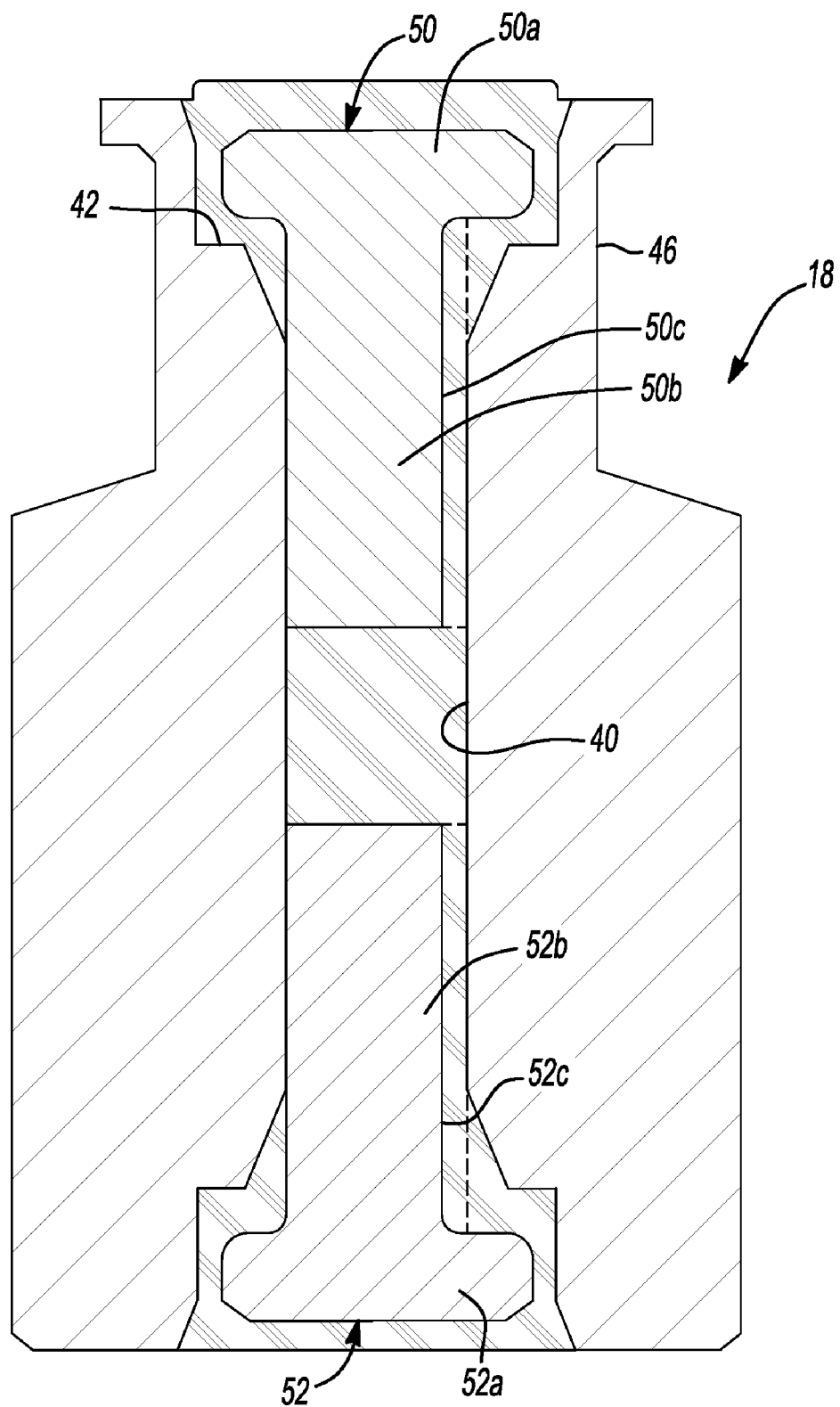
FIG. 2 is a section view of a solenoid plunger assembly according to the present disclosure.

The following description is merely exemplary in nature and is not intended to limit the present disclosure, application, or uses. It should be understood that throughout the drawings, corresponding reference numerals indicate like or corresponding parts and features.

As seen in FIG. 1, an exemplary solenoid valve 10 is shown in an open position. Solenoid valve 10 may include a valve assembly 12 and an actuation assembly 14. Valve assembly 12 may include a valve housing 16, a plunger 18, and a biasing member 20. Actuation assembly 14 may include a solenoid coil 22 and a solenoid coil housing 24. Solenoid coil 22 may surround valve housing 16 and may be selectively energized to cause displacement of plunger 18 relative to valve housing 16. Solenoid coil housing 24 may surround solenoid coil 22 providing protection from contamination.

Valve housing 16 may include first and second ports 26, 28 providing for selective communication between first and second fluid paths in a system. Plunger 18 may be slidably disposed within valve housing 16 and may provide selective communication between first and second ports 26, 28. Plunger 18 may be biased in a closed position (not shown) by biasing member 20. Biasing member 20 may take a variety of forms, such as a coil spring. The valve assembly 12 can be a normally open or normally closed valve arrangement.

Plunger 18 may include a body 30 having first and second ends 32, 34 having first and second recesses 36, 38 extending axially therein. A central passage 40 may extend between first and second recesses 36, 38. Central passage 40 may have a diameter that is less than the diameter of first and second recesses 36, 38, forming a pair of annular seats 42, 44 therebetween. Body 30 may include a reduced diameter portion 46 near first end 32. Plunger 18 may further include a seal assembly 48 retained within first and second recesses 36, 38.

The seal assembly 48 can include pin members 50, 52 press-fit into the first and second recesses 36, 38, respectively. The pin members 50, 52 can include a head portion 50a, 52a and a shank portion 50b, 52b. It should be understood that the shank portions 50b, 52b of the pin members 50, 52 can have various shapes including a triangular shape, square, or rectangular shapes or can be round with axially extending recessed grooves defining flow passages 50c, 52c therein that allow the flow of elastomeric material therepast. The shank portions 50b, 52b are press-fit into the central passage 40 with the head portion 50a, 52b spaced from the annular seats 42, 44. The annular seats 42, 44 or areas adjacent the seats 42, 44 can be tapered to facilitate the flow of elastomeric material therepast. The shape of the shank portions 50b, 52b define flow passages 50c, 52c designed to allow the flow of elastomeric material into the central passage 40, as illustrated in FIG. 3b. Once the pin members 50, 52 are inserted into the plunger 18, an elastomeric sealing element 54 is molded around the pin members 50, 52 while they are inserted into the recesses of the plunger.

The design of the present disclosure eliminates high press-in forces required with prior art designs which sometimes result in rubber fracture during assembly. The molded-in pin member mechanically lock the rubber seal into the core body. The elastomeric sealing element 54 is allowed to pass through the flow passages 50c, 52c between the shank portion 50b, 52b and the central passage 40. In addition, the head portions 50a, 52a are spaced from the seat portion 42, 44 to allow the flow of elastomeric material into the central passage 40.

The design of the present disclosure can eliminate the need for adhesive application to the pins and/or the core body. Current production designs have a single, solid unbounded rubber seal molded through the core body inner diameter, which allows movement of the rubber in application, negatively affecting seal function. Pin members 50, 52 will not allow through-molded rubber to move in application because the pressed-in pins provide a mechanical lock and positive back-up of the sealing surfaces. Previous press-in designs rely on critical heights to be controlled by pressing on the rubber area of the pins wherein the height can be difficult to control due to rubber displacement during press-in. With the design of the present disclosure, the press-in force on the pins can be increased because the press-in tool pushes directly on the face of the metal pin rather than the rubber sealing surface. The shape of the stem of the pins allows rubber to flow from top to bottom of the part during molding and can be altered for optimum flow pass size and pattern.

What is claimed is:
1. A valve comprising:
a housing defining a longitudinal axis;

a valve body slidably disposed within said housing for selective displacement along said longitudinal axis, said valve body including a recess in a first end thereof; and a seal assembly located within said recess and including a pin member inserted into the recess and an elastomeric sealing element molded into said recess and around proximal and distal ends of said pin member while said pin member is inserted into said recess of said plunger valve body so that said proximal and distal ends of said pin member are covered with said elastomeric sealing element.

2. The valve of claim 1, wherein said recess extends axially into said end of said valve body.

3. The valve of claim 1, wherein said pin member includes a head portion and a shank portion, said shank portion including an axially extending groove in a surface thereof, said elastomeric sealing element integrally molded onto said head and between said axially extending groove and said recess.

4. The valve of claim 1, wherein said recess includes a longitudinally disposed passageway extending through said first end and a second end of said valve body opposite said first end.

5. The valve of claim 4, wherein said seal assembly includes a second pin member inserted into said recess at said second end of said valve body, said pin member includes a head portion and a shank portion including an axially extending groove therein, said elastomeric sealing element integrally molded around said pin member while said pin member is inserted into said recess of said plunger.

6. A solenoid valve comprising:
   a housing;
   a solenoid coil disposed about an external portion of said housing; and
   a plunger slidably disposed within said housing, said plunger including a recess in a first end thereof having a seal assembly including a pin member inserted into the recess and an elastomeric sealing element molded around proximal and distal ends of said pin member while inserted into said recess of said plunger so that said proximal and distal ends of said pin member are covered with said elastomeric sealing element.

7. The solenoid valve of claim 6, wherein said recess extends axially into an end of said plunger.

8. The solenoid valve of claim 6, wherein said recess includes a longitudinally disposed passageway extending through said first end and a second end of said valve body opposite said first end.

9. The solenoid valve of claim 7, wherein said seal assembly includes first and second pin members, said first pin member disposed within said passageway at said first end and said second pin member disposed within said passageway at said second end.

10. The solenoid valve of claim 9, wherein said elastomeric sealing element is integrally molded around said first and second pin members while said first and second pin members are inserted into said recess of said plunger.

11. The solenoid valve of claim 6, wherein said pin member includes a head portion and a shank portion, said shank portion including an axially extending groove therein, said elastomeric sealing element integrally molded onto said head and between said axially extending groove and said recess.

12. A method of making a valve body, comprising:
   inserting a pin member having a head portion and a shank portion with an axially extending groove extending along said shank portion to a distal end of said pin member away from said head portion into a recess in a first end of a valve body, said recess having a head receiving portion and a shank receiving portion wherein said shank portion is press-fit into said shank receiving portion and said head receiving portion has an inner wall portion spaced from said head portion; and
   injection molding an elastomeric sealing element into said recess and around a proximal and said distal ends of said pin member while said pin member is inserted into said recess of said valve body.

13. The method of claim 12, wherein said recess includes a longitudinally disposed passageway extending through said first end and a second end of said valve body opposite said first end; and
   further comprising inserting a second pin member having a head portion and a shank portion with an axially extending groove into said recess in said second end of said valve body, said elastomeric sealing element being molded around said second pin member.

* * * * *